US008735787B2

(12) United States Patent
Prevost et al.

(10) Patent No.: US 8,735,787 B2
(45) Date of Patent: May 27, 2014

(54) APPARATUS FOR WELDING A PLASTIC COMPONENT TO THE APERTURE OF A PLASTIC BODY

(75) Inventors: Dominic Prevost, Bois-des-Filion (CA); Leonard Desaulniers, Beloeil (CA); Robert Battaglia, Montreal (CA); Paul Leblanc, Quebec (CA); Benoit Lavallee, Pointe aux Trembles (CA); Regis Metivier, Montreal (CA)

(73) Assignee: Axium, Inc., Montreal (Quebec) (CA)

( * ) Notice: Subject to any disclaimer, the term of this patent is extended or adjusted under 35 U.S.C. 154(b) by 1335 days.

(21) Appl. No.: 12/462,217

(22) Filed: Jul. 31, 2009

(65) Prior Publication Data
US 2009/0294071 A1 Dec. 3, 2009

Related U.S. Application Data

(62) Division of application No. 11/347,581, filed on Feb. 6, 2006.

(51) Int. Cl.
*H05B 6/80* (2006.01)
*B32B 41/00* (2006.01)

(52) U.S. Cl.
USPC .......................................... 219/757; 156/378

(58) Field of Classification Search
CPC B29C 65/7802; B29C 65/863; B29C 65/203; B29C 65/2084; B29C 65/2086; B29C 66/53247; B29C 66/872; B29C 66/874; B60K 15/03177
USPC ........... 219/757; 414/729–741; 318/638–640; 901/46–50; 156/378
See application file for complete search history.

(56) References Cited

U.S. PATENT DOCUMENTS

| 4,638,231 A | 1/1987 | Monforte ...................... 318/640 |
| 5,204,598 A | 4/1993 | Torii et al. .................. 318/568.1 |
| 2003/0160520 A1 | 8/2003 | Gloden et al. ................ 307/326 |

(Continued)

FOREIGN PATENT DOCUMENTS

| CA | 2 357 271 A1 | 9/2002 |
| CA | 2 532 850 A1 | 7/2006 |

(Continued)

OTHER PUBLICATIONS

Yachiyo Industry Co. Ltd, Translation of JP 2004-276485, Welding device, Aug. 6, 2013, http://dossier1.ipdl.inpit.go.jp/cgi-bin/tran__web_cgi_ejje?u=http%3A%F%2Fdossier1%2E . . . .*

*Primary Examiner* — Quang Van
(74) *Attorney, Agent, or Firm* — Harrington & Smith

(57) ABSTRACT

An apparatus for welding a plastic component to a body's aperture includes a first heating head mounted to a frame element for heating the component, a gripper for gripping the component and for mounting the component to the body's aperture, a heater arm having a second heating head mounted thereto for heating the aperture, and an actuator for mounting both the heater arm and the gripper to the frame element for alternating between a heating position wherein ia) the gripper is generally aligned with the first heating head for abutment therewith, while ib) the second heating head is positioned for heating the aperture, and a work position wherein ii) the gripper is generally aligned with the aperture for mounting the component to the aperture for welding therewith: The gripper is mounted to the actuator via a cylinder arm provided with a collision monitor to detect inadvertent collision.

21 Claims, 11 Drawing Sheets

(56) References Cited

U.S. PATENT DOCUMENTS

2003/0209893 A1* 11/2003 Breed et al. .................. 280/735
2005/0194401 A1   9/2005 Khoshnevis ................. 222/100
2007/0181571 A1   8/2007 Prevost et al. ............... 219/757

FOREIGN PATENT DOCUMENTS

| JP | 2001-222883 | 9/1989 |
| JP | 2004-0186545 | 7/2004 |
| JP | 2004276485 A | 10/2004 |

* cited by examiner

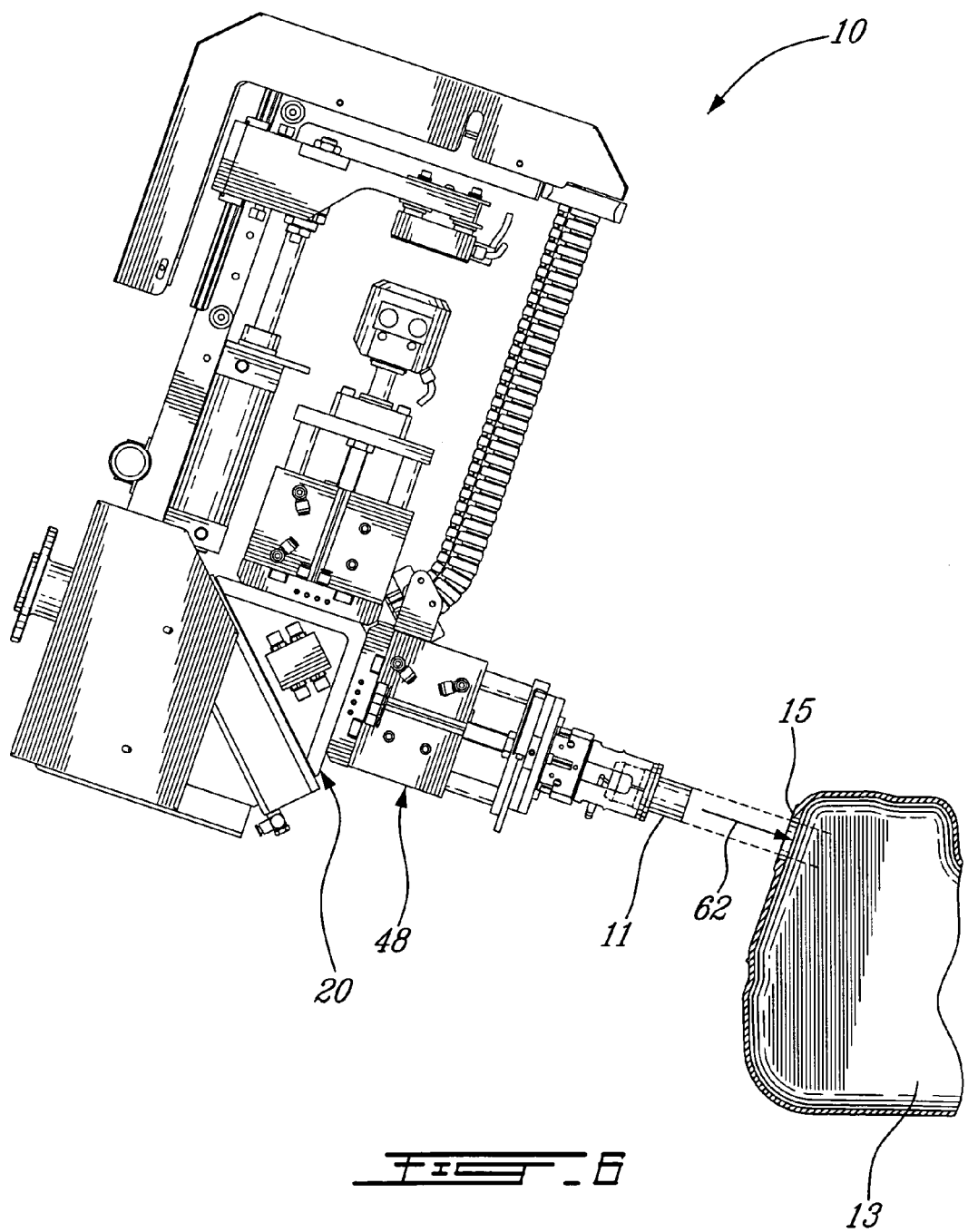

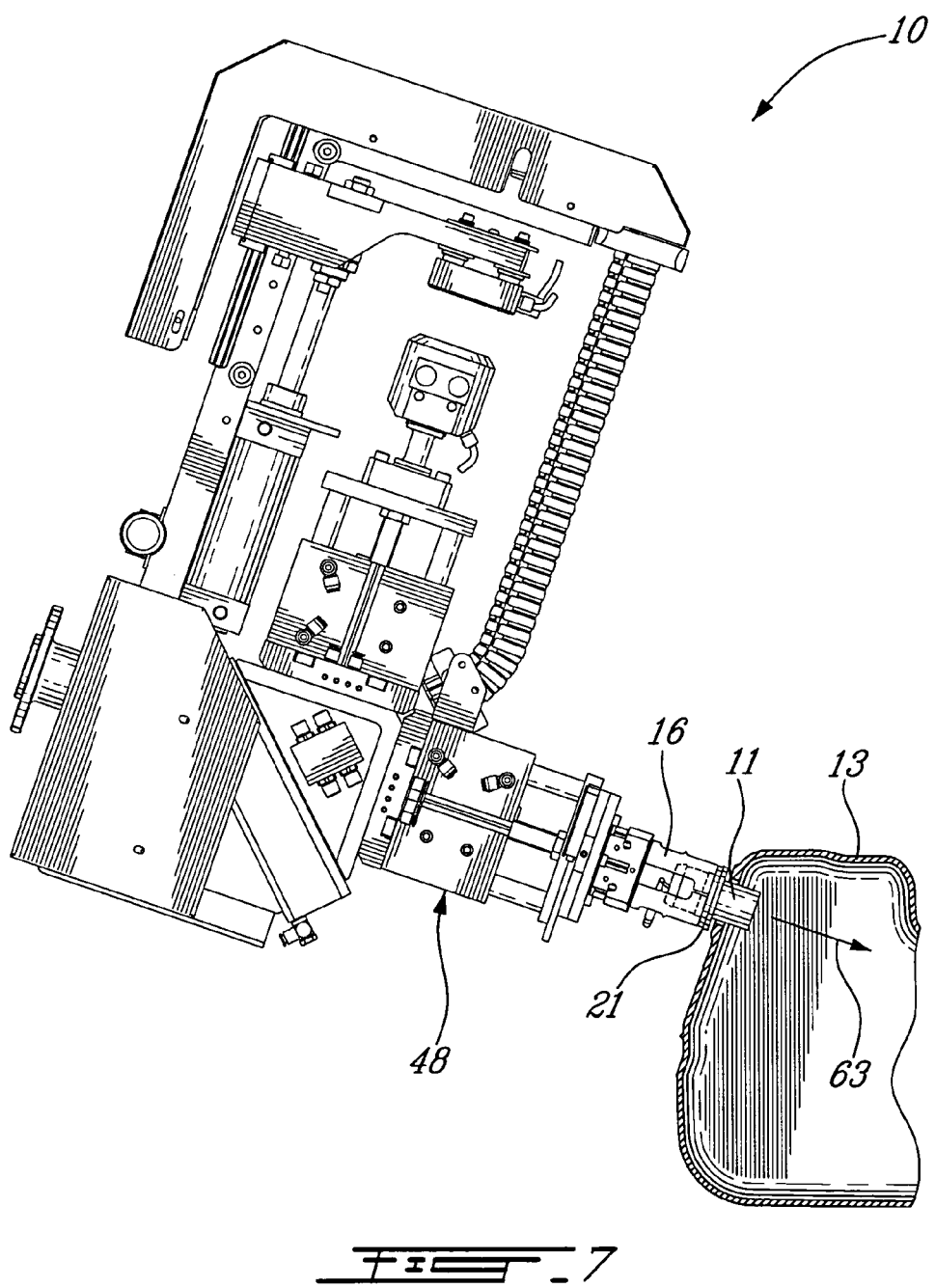

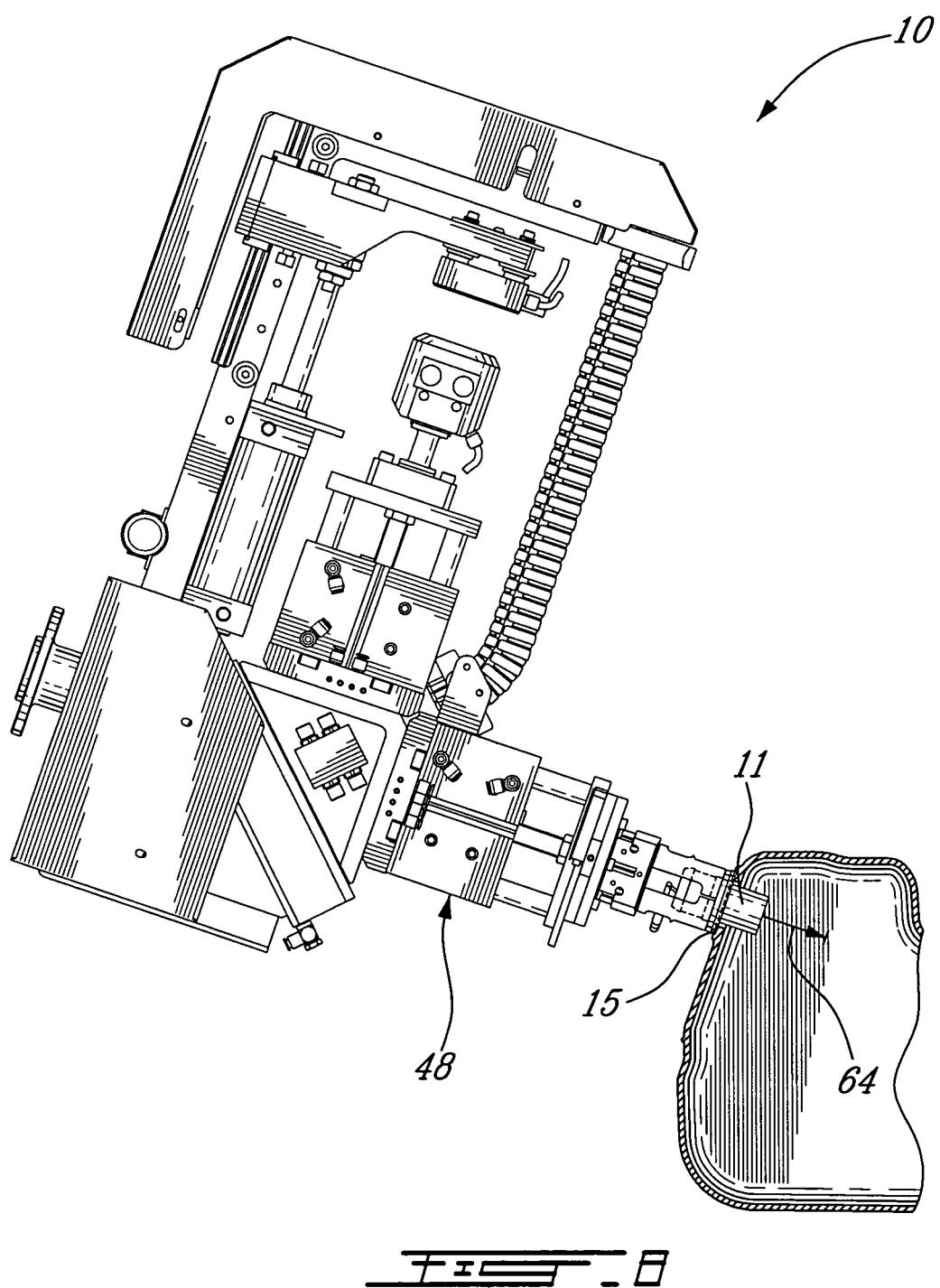

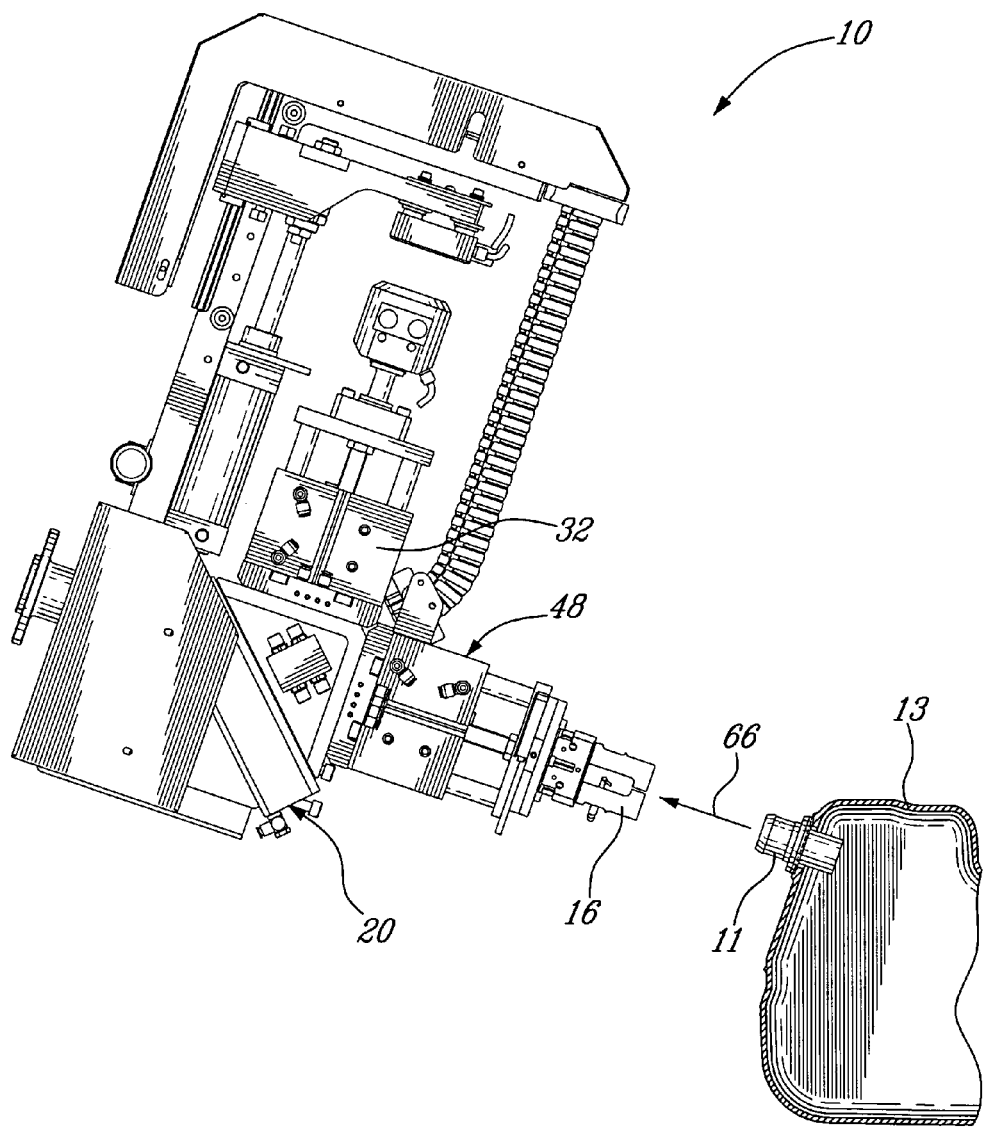

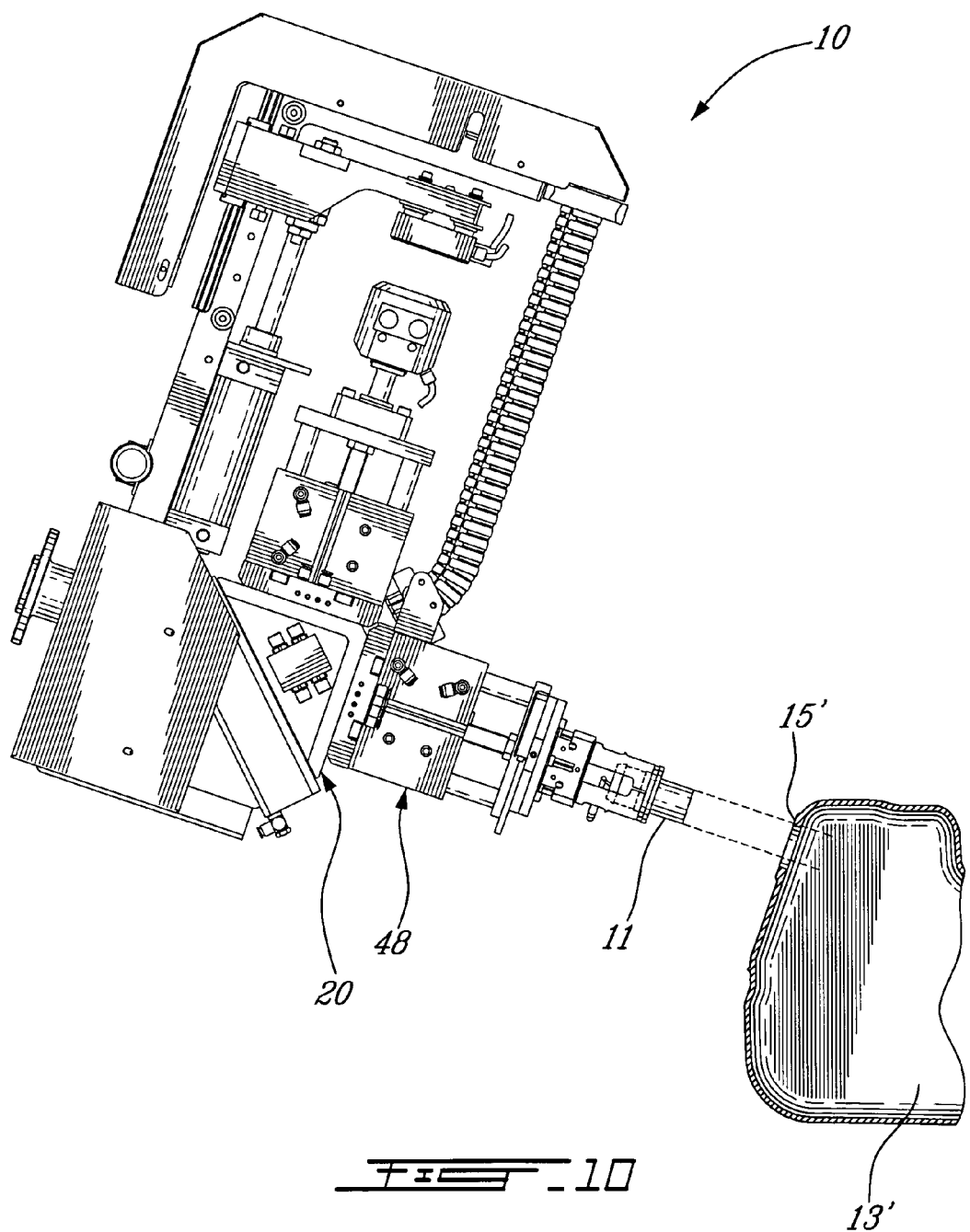

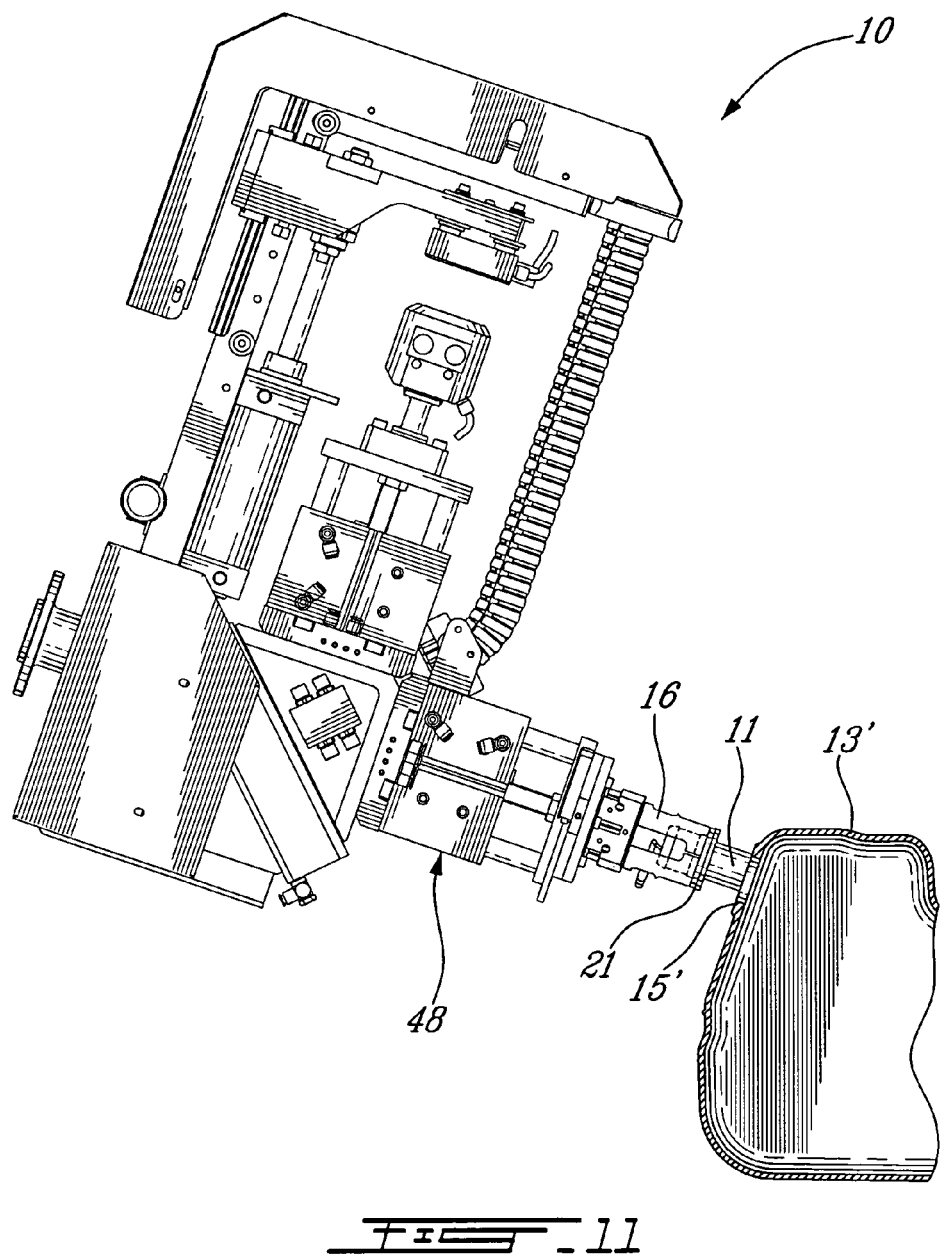

US 8,735,787 B2

APPARATUS FOR WELDING A PLASTIC COMPONENT TO THE APERTURE OF A PLASTIC BODY

CROSS REFERENCE TO RELATED APPLICATION

This is a divisional patent application of co-pending U.S. patent application Ser. No. 11/347,581 filed on Feb. 6, 2006.

FIELD OF THE INVENTION

The present invention relates to welding of plastic components.

More specifically, the present invention relates to an apparatus for welding a plastic component to a plastic body's aperture such as for example a component to a gas tank hole.

BACKGROUND OF THE INVENTION

Robot tools for welding a plastic part to the aperture of a gas tank are already known in the art. Such tools include a first heater to heat the plastic part, a second heater to heat the gas tank around its aperture, and gripper means for positioning the part within the aperture for a certain time during welding to allow its securing to the tank.

A drawback of such robot tools from the prior art is that misalignment of the plastic part during welding or during any other steps of the overall welding process might yield a resulting defective gas tank. At best, these defective gas tanks can be detected during a post-production visual inspection which of course takes additional time, is costly and is often unreliable.

OBJECTS OF THE INVENTION

An object of the present invention is therefore to provide an improved apparatus for welding a plastic component to a body's aperture such as a gas tank.

Another object of the invention is to provide such an apparatus free of the above-mentioned drawbacks of the prior-art.

SUMMARY OF THE INVENTION

More specifically, in accordance with the present invention, there is provided an apparatus for welding a plastic component to a plastic body's aperture comprising:

a frame element;

a first heating head mounted to the frame element for heating the component;

a gripper for gripping the component and for mounting the component to the body's aperture;

a heater arm having a second heating head mounted thereto for heating the body's aperture; and an actuator for mounting both the heater arm and the gripper to the frame element for alternating between a heating position wherein i) ia) the gripper is generally aligned with the first heating head for abutting the component therewith following relative movement towards each other, while ib) the second heating head is positioned for heating the body's aperture, and a work position wherein ii) the gripper is generally aligned with the body's aperture for mounting the component to the body's aperture for welding therewith.

According to a second aspect of the present invention, there is provided an apparatus for welding a plastic component to a body's aperture comprising:

a frame element;

a heater mounted to the frame element for heating at least one of the body's aperture and the component; and a gripper mounted to the frame element for gripping the component and for mounting the component to the body's aperture; the gripper including a collision monitor to detect an inadvertent collision of the component with the body while the component is mounted to the body's aperture.

According to a third aspect of the present invention, there is provided a gripper tool for a robot for mounting a plastic component to a plastic body's aperture, the tool comprising:

a gripper hand for receiving the component and for selectively releasing the component in the body's aperture;

a gripper arm cylinder for mounting the gripper hand to the robot; the gripper arm cylinder having a collision monitor for detecting inadvertent collision of the component in the gripper hand with the body; and a controller coupled to the collision monitor; the controller being configured to trigger an alarm upon detecting the inadvertent collision.

It is to be noted that the expression "plastic" is used herein to refer to any polymeric material, or including a polymer of any kind and being able to melt at least partially under heat. It is not intended to be construed in any limited way.

Other objects, advantages and features of the present invention will become more apparent upon reading the following non restrictive description of illustrated embodiments thereof, given by way of example only with reference to the accompanying drawings.

BRIEF DESCRIPTION OF THE DRAWINGS

In the appended drawings:

FIG. 6 is a side elevation similar to FIG. 2, illustrating the apparatus moving towards the tank for mounting the component to the tank's aperture;

FIG. 7 is a side elevation similar to FIG. 2, illustrating the component being mounted to the tank's aperture by the apparatus;

FIG. 8 is a side elevation similar to FIG. 2, illustrating the gripper applying small pressure onto the component for welding with the tank's aperture;

FIG. 9 is a side elevation similar to FIG. 2, illustrating the withdrawal of the apparatus after welding of the component;

FIG. 10 is a side elevation similar to FIG. 6, illustrating the apparatus in a collision path with the tank wall; and FIG. 11 is a side elevation similar to FIG. 2, illustrating the component contacting the tank wall.

DETAILED DESCRIPTION

Figure 1:
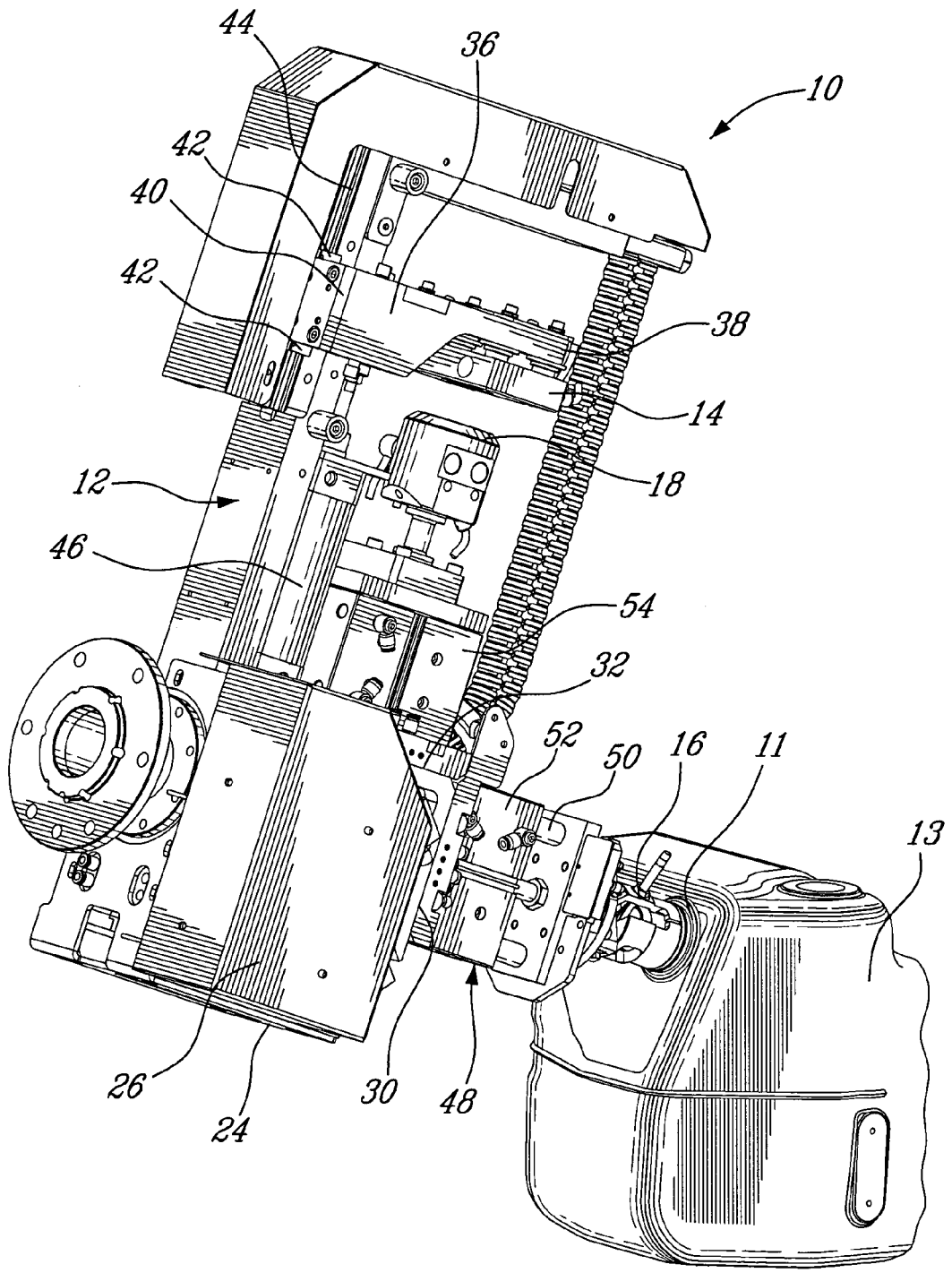
FIG. 1 is a perspective view of an apparatus for welding a plastic component to a gas tank according to an illustrative embodiment of the present invention.

An apparatus 10 for welding a plastic component 11 to a gas tank 13 according to an illustrative embodiment of the present invention will now be described with reference to FIGS. 1 and 2.

The apparatus 10 comprises a frame 12, a component heater 14 mounted to the frame 12, a gripper hand 16 for gripping the component 13, a tank heater 18 for heating the body's aperture 15, and a rotary actuator 20 for mounting the tank heater 18 and gripper 16 to the frame 12 for alternating between a heating position wherein the gripper 16 is aligned with the component heater 14 while the tank heater 18 is positioned for heating the body's aperture 15, and a welding position wherein the gripper 16 is aligned with the body's aperture 15 so as to be positioned for welding the gripped component 11 therewith.

The component 11 is in the form of a plastic cylindrical gas inlet having a peripheral collar 21 about halfway between the two longitudinal ends thereof. As will be described hereinbelow in more detail, the apparatus 10 allows simultaneously heating the component 11 and the peripheral edge of the tank's aperture 15 and then inserting the component 11 in the aperture 15 so that its collar 21 abuts the tank wall for welding therewith (see FIG. 9).

Each of the components of the apparatus 10 will now be described in more detail.

The frame 12 includes a rigid post for supporting and mounting the different component of the apparatus 10.

The actuator 20 includes an output shaft (not shown). The actuator is so mounted to the post 12 via a first slanted hollow block 22 that the output shaft of the actuator defines a 45 degrees angle with the post 12. The actuator 20 is secured to the slanted block 22, which is secured to the post 12. Bottom and side plates 24 and 26 are used to secure the actuator 20 and first slanted block 22 to the post 12. Of course, many other arrangements can be provided to mount the actuator 20 to the post 12 so as to yield a 45 degrees angle between the output shaft of the actuator 20 and the post 12.

A second slanted hollow block 28 is provided to mount the tank heater 18 and the gripper 16 to the output shaft of the actuator 20. The second slanted hollow block 28 includes two perpendicular surfaces 30 and 32 for respectively receiving the gripper 16 and the tank heater 18, and a complementary third edge surface 34 for abutment with the surface of the actuator 20 from which protrude the output shaft. The hollow block 28 is configured for coupling with said output shaft of the actuator 20 for rotation in unison. The hollow block 28 is also configured for receiving cables or any other coupling means required for the operation of the gripper and tank heater arm cylinders 48 and 54.

In operation, a 180 degrees rotation of the output shaft of the actuator 20 results in alternatively aligning with the component heater 14 either one of the gripper 16 and the tank heater 18, the other one being then positioned for working on the tank 13 as will be explained furtherin in more detail.

The component heater 14 is in the form of a well-known heating head slidably mounted to the post 12 for reciprocal movement therealong and so distanced from the post 12 as to be aligned with either one of the gripper 16 and the tank heater 18. More specifically, the component heater 14 is suspended to the distal end 38 of an arm 36. The proximate end 40 of the arm 36 is slidably mounted to the post 12 via a bearing assembly 42 secured to the arm 36 and operatively coupled to a side rail 44 mounted along the post 12 therealong. Translation of the arm 36 is achieved via a pneumatic cylinder 46 mounted to both the arm 36 and to the post 12 therealong. Other types of cylinder may also be used.

According to a further embodiment of the present invention (not shown) the component heater 14 is fixedly mounted to the post 12, while the gripper 16 is movably mounted to the actuator 48 via the slanted block 32 for reciprocal movement along the post 12.

The heating head 14 is in the form of a ring for complementary receiving the component 11 for contact with its peripheral collar 21 for heating thereof.

Each of the two heaters 14 and 18 are independent and are provided with two resistance temperature detectors (RTDs), one acting as a backup. Of course, each heater 14 and 18 can also be provided with only one RTD.

The two heaters 14 and 18 may take other forms depending on the configurations of the component 11 and of the tank's aperture 15.

The gripper 16 is mounted to one of the surface 30 of the second slanted block 28 via a first arm cylinder 48. As it is believed to be well-known in the art, the arm cylinder 48 includes pistons 50 mounted in a casing 52 so as to extend therefrom for reciprocal movement therein. The movement of the arm 48 is controlled via a controller (not shown). Since such arm cylinders are believed to be well-known in the art, and for concision purposes, they will not be described furtherin in more detail.

The cylinder 48 includes a linear magnetic encoder (not shown) acting as a collision monitor for precisely monitoring collision with the component 11 while the component 11 is being picked from a feeder (not shown) and for monitoring collisions when the component is inserted into the component heater 14 (see FIG. 3) and mounted to the tank's aperture 15 (see FIG. 11 for example). The encoder further allows measuring the component melt depth or weld depth.

The linear magnetic encoder may be replaced by any other type of linear encoder allowing measuring the translation of the pistons 50. A laser linear encoder can for example be used.

The first arm cylinder 48 is also used to apply force between the component 11 and the heating head 14 during heating or between the component 11 and the tank 13 during welding when proper alignment is achieved as detected by the linear encoder.

The tank heater 18 is mounted to the second surface 32 of the two perpendicular surfaces 30-32 of the second slanted block 28 via a second arm cylinder 54 identical to the first arm cylinder 48. The second arm cylinder 54 is also equipped with a linear encoder for monitoring the tank melt depth. As will be explained hereinbelow in more detail, the second arm cylinder 54 also allows applying a predetermined force during the heating of the tank 13.

The first and second arm cylinders 48 and 54 are in the form of pneumatic cylinders. They are provided with independent pressure regulators. Since pressure regulators and the operation of arm cylinders are believed to be well known in the art, and for concision purposes, they will not be described furtherin in more detail.

The gripper tool 16 can take any form allowing to receive and to selectively grip and release the component 11. Of course, the gripper tool 16 can be adapted depending on the application of the apparatus 10 and more precisely on the component to weld.

The apparatus 10 is mounted to a robot (not shown) through its frame member 12. The robot provides for precise three-dimensional displacement of the apparatus, for example to bring the apparatus 10 towards and away the tank 13.

As will be explained hereinbelow in more detail, the first and second cylinders 48 and 54 are used to apply pressure and to absorb and detect collisions. The other movements required by the welding process are achieved by the robot to which the apparatus 10 is mounted, including precisely positioning the tank heater 18 onto the tank's aperture 15 and mounting the component 11 thereto using the gripper 16. Of course, such movements are controlled using a PLC (programmable logic controller) type controller or a computer. Since PLC controllers and computers and their general operations are believed to be well known in the art, they will not be described herein in more detail.

A calibration of the apparatus 10 is first performed prior to its operation for the different orientations that the apparatus 10 will have to work in. This step includes determining the pressure that have to be applied on either side of each of the first and second cylinders 48 and 54 to compensate for gravity in a given orientation. After calibration, the apparatus will compensate for gravity when applying a force while in this particular orientation. The different pressures for different orientations are saved in the controller's memory (not shown).

The operation of the apparatus 10 will now be described in more detail with reference to FIGS. 2 to 9.

The apparatus 10 is first positioned so that its gripper 16 is aligned with a component 11 to be picked in a feeder (not shown). The gripper 16 is then in an open configuration. The apparatus 10 is then moved by the robot towards the component 11. During this movement, the linear encoder of the gripper arm cylinder 48 is monitored to detect whether the gripper 16 hits the component 11. More specifically, the gripper cylinder 48 is fully extended and very low pressure is applied thereon. This allows preventing damaging the component 11 if a collision occurs between the gripper 16 and the component 11. The robot moves towards the component 11, compressing the gripper cylinder 48 when the gripper touches the component 11. An alarm triggers whenever the gripper cylinder 48 retracts more than a predetermined length. Such over-retraction is indicative of a problem caused for example by the component 11 not sitting correctly in the feeder, by the component 11 being defective, by the gripper 16 being obstructed, etc.

Figure 2:
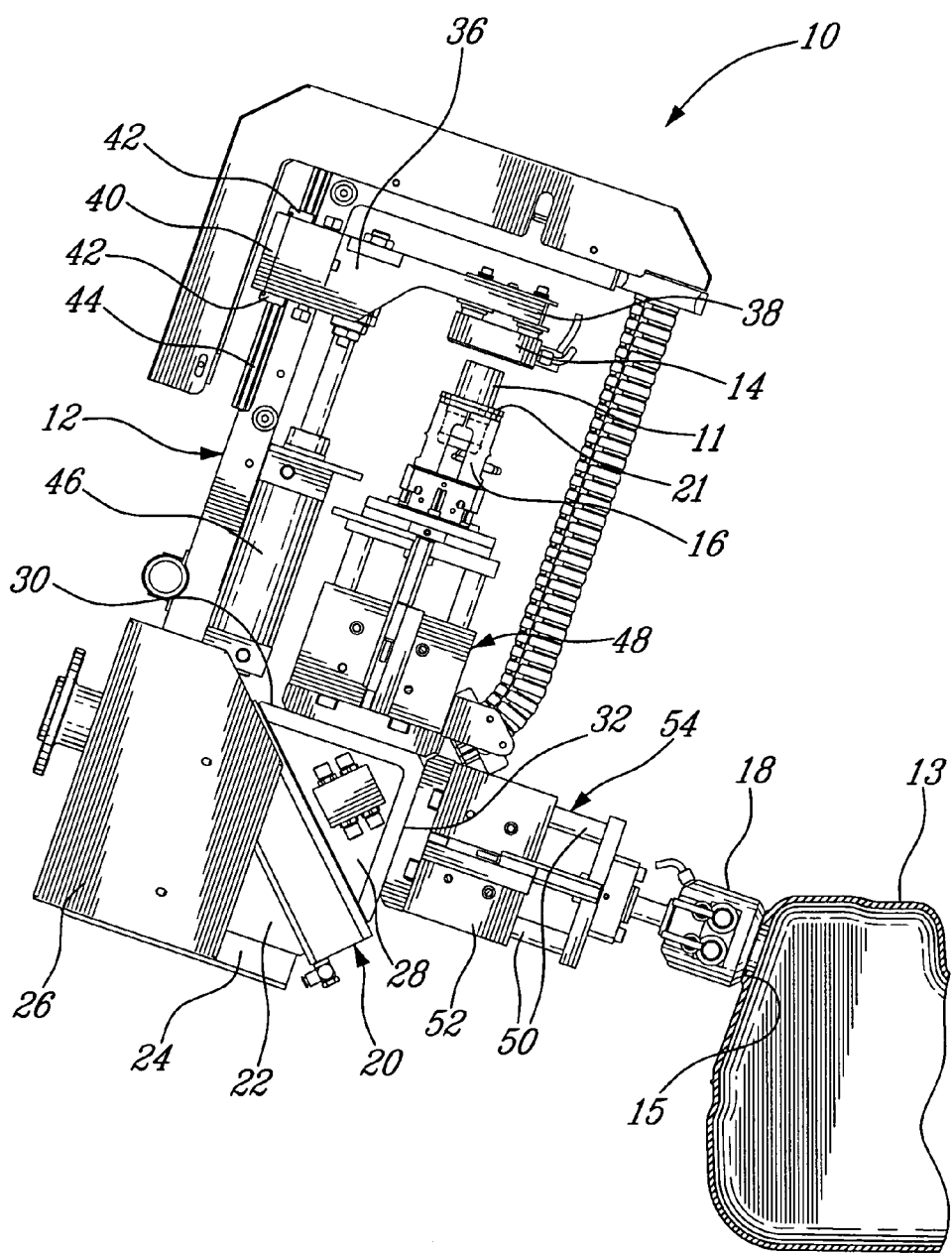
FIG. 2 is a side elevation of the apparatus from FIG. 1, illustrating the gripper aligned with the component heater while the tank heater is positioned for heating the body's aperture.

Turning now to FIG. 2, the apparatus 10 is then positioned in a heating position wherein the gripper 16 is aligned with the component heater 14 while the tank heater 18 is aligned with the body's aperture 15. A very low force is then applied on the tank heater arm 54. The force applied on the tank heater arm 54 is such that the tank heater 18 does not cause any damage to the body's aperture 15 if there is collision therebetween.

The tank heater 18 is then brought forward in the direction of the tank 13 by the robot to couple the tank heater 18 and the tank's aperture 15. A matching force is first applied on the tank heater cylinder 54 for a predetermined matching period. Applying such a matching force between the tank heater 18 and the tank 13 allows evening the surface of the tank 13.

At the end of this predetermined matching time, a heating force greater than the matching force is applied for a predetermined heating period. At the end of this heating period, the robot is withdrawn from the tank 13.

Figure 3:
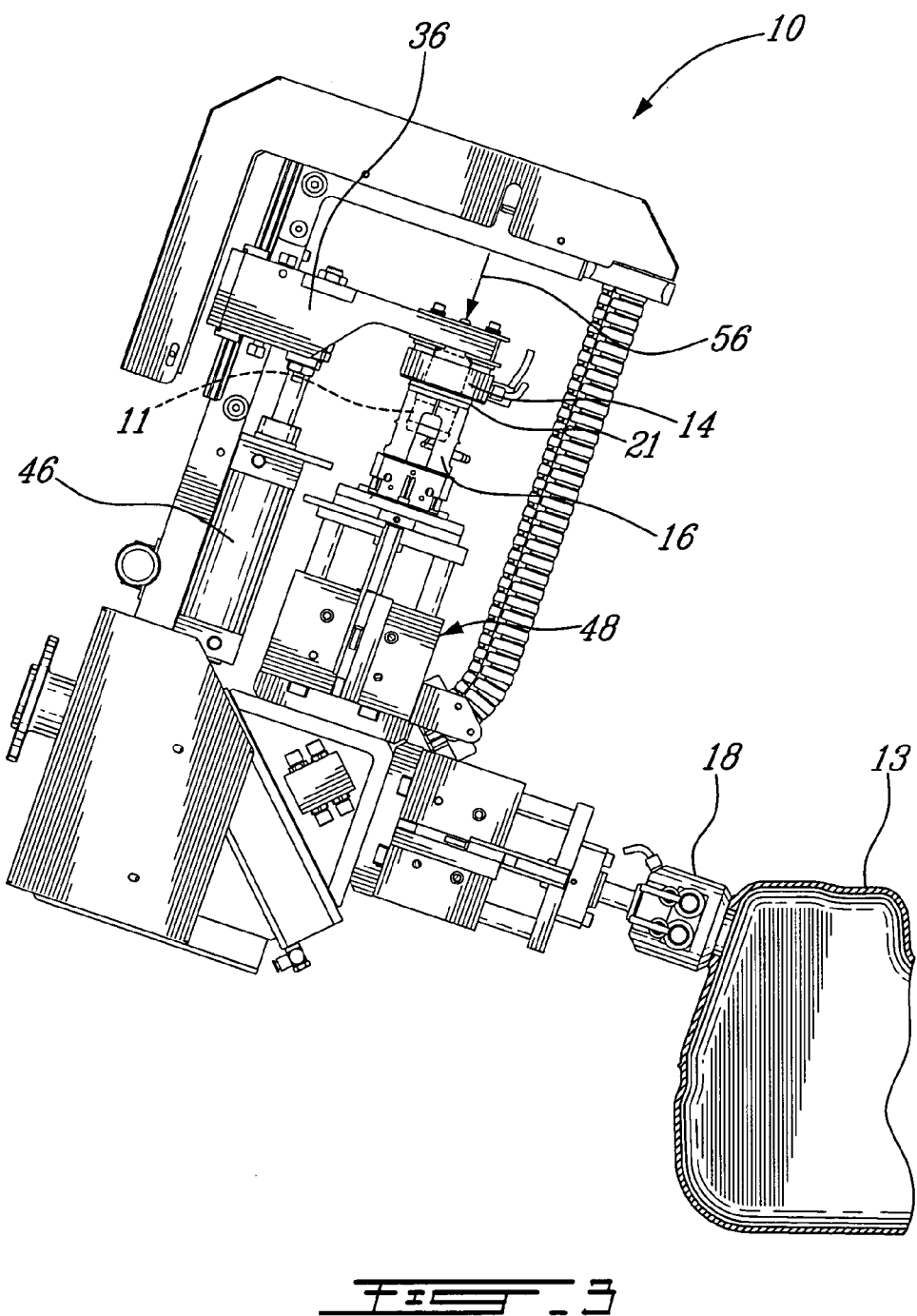
FIG. 3 is a side elevation similar to FIG. 2, illustrating the component heater lowered onto the component.

As illustrated in FIG. 3, the component heater's arm 36 is lowered (see arrow 56) for positioning the component heater 14 for heating the component 11. During this movement, the linear encoder of the gripper arm 48 is monitored to detect any unforeseen contact between the component heater 14 and the component 16. If such unforeseen contact occurs, an alarm is triggered and the welding process is stopped. More precisely, the only collision that should be detected by the linear encoder of the arm cylinder 48 is when the collar 21 of the component 11 contacts the heating head 21. An alarm is triggered if more than one collision is detected. This may be caused for example by the component 11 not being gripped correctly, by the component 11 being defective, or by the component heater 21 being obstructed.

It is to be noted that prior to the lowering of the arm 36, the arm cylinder 48 of the gripper 16 is extended, the component heater cylinder 46 is retracted (not shown) and low pressure is applied on the gripper arm cylinder 48.

After a predetermined delay following the beginning of the heating of the tank 13 by the tank heater 18, the component 11 is heated for the predetermined heating period.

Similarly to the heating of the tank 13, the heating of the component 11 is a two-step process. A matching force is first applied for a first predetermined period of time. Then, a heating force that is greater than the heating force is applied by the arm 36 onto the part 11 for the predetermined heating period. The cylinder 46 is mechanically limited for providing a controlled heat transfer between the component heater 14 and the part 11.

Figure 4:
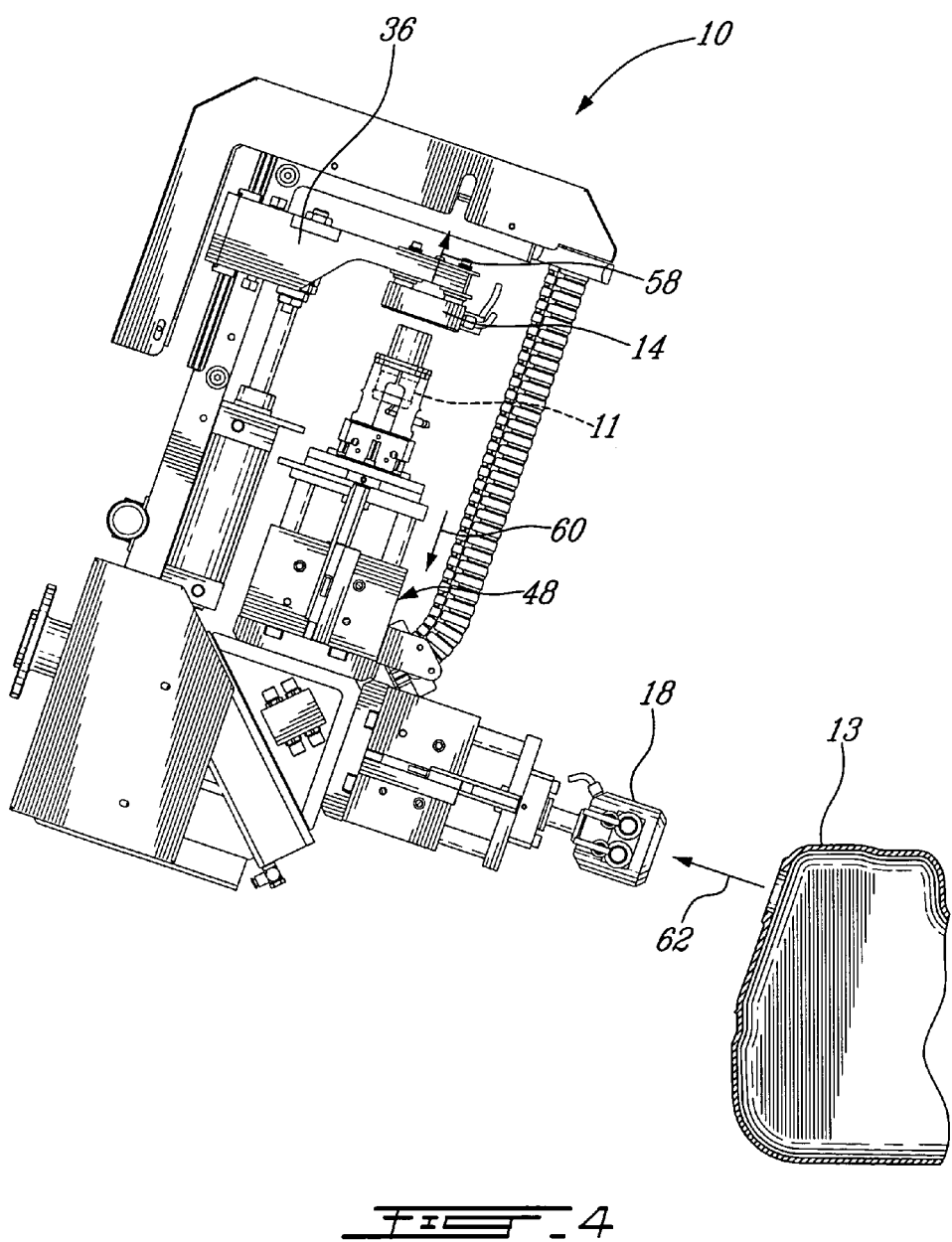
FIG. 4 is a side elevation similar to FIG. 2, illustrating the retraction of the component heater from the component and of the apparatus from the tank.

Turning now to FIG. 4, at the end of the heating period of time, the component heater 14 is raised from the component 11 by the arm 36 (see arrow 58), the arm cylinder 48 of the gripper 16 is retracted (see arrow 60), and the robot removes the tank heater 18 from the tank 13 (see arrow 62). According to the present example, the component heating and tank heating processes end at the same time.

Of course, the timing of the delay before the above-described heating processes, the duration and sequence thereof may vary depending on the application. Single-step heating processes can also be used.

Figure 5:
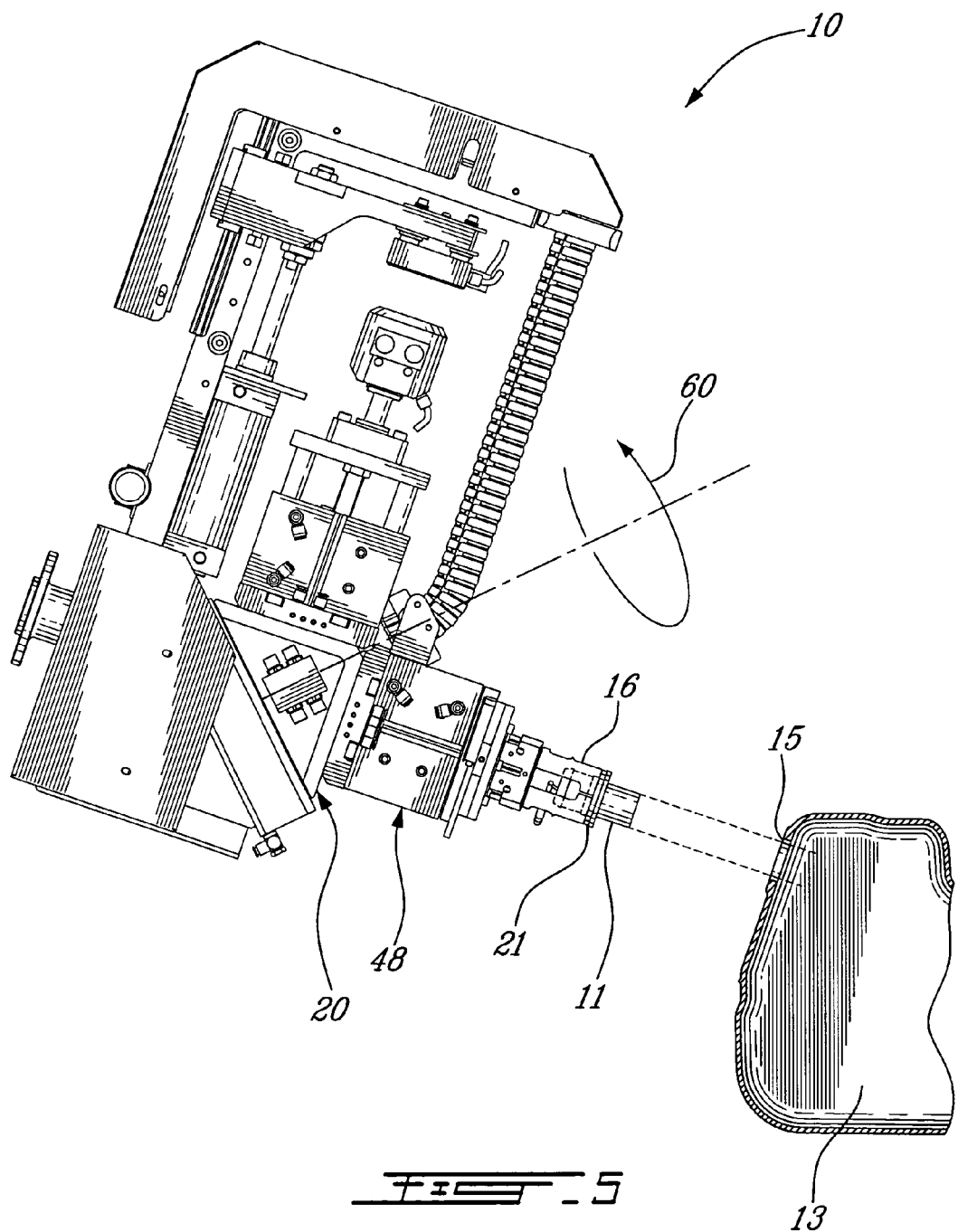
FIG. 5 is a side elevation similar to FIG. 2, illustrating the operation of the rotary actuator.

As illustrated in FIG. 5, the actuator 20 is then rotated (see arrow 60) and the robot moves so that the gripper 16 is aligned with the body's aperture 15 for mounting the component 11 thereto.

FIG. 6 illustrates the gripper arm 48 in a work position. Following, the rotation of the actuator 20 and the alignment of the robot, the gripper arm cylinder 48 is extended and a low force is applied thereon. The robot moves the apparatus 10 towards the tank 13 (see arrow 62 on FIG. 6 and 63 on FIG. 7) while maintaining the alignment between the gripped component 11 and the tank's aperture 15. During this movement of the robot towards the tank 13, the linear encoder of the gripper arm cylinder 48 is monitored to detect collisions between the component 11 and the tank 13.

The component 11 hitting the tank 13 or rubbing against the edge of the aperture 15 causes the gripper arm cylinder 48 to move back or retract. The apparatus 10 can be calibrated so that an alarm is triggered whenever the gripper arm cylinder 48 moves back more than a certain number of pulses for example. This can be caused for example by the component 11 not being gripped correctly by the gripper 16, by a component being defective, the tank's aperture being obstructed or not being positioned correctly. In all these cases, a person skilled in the art will appreciate that the welding process be stopped and an alarm triggered.

The alarm can alternatively be set so as to trigger to different collision pattern than the one described herein, depending, for example, on the application.

When the apparatus 10 reaches the welding position illustrated in FIG. 8, wherein the component 11 is properly mounted in the tank's aperture 15, a predetermined fusion force is applied by the arm cylinder 48 towards the tank 13 (see arrow 64).

The welding position is detected as follows: the robot moves forward to a known position relatively to the tank 13. This known position, which is illustrated in FIG. 7, corresponds to the component 11 being partially inserted in the tank's aperture 15. If this forward movement can be achieved without the arm cylinder 48 detecting a collision, then the movement towards the tank 13 is completed by the peripheral collar 21 of the component 11 abutting the external wall of the tank 13. A single collision is then detected, resulting in the detection of the welding position.

After a predetermined fusion delay, the gripper 16 opens to release the component 11 and the apparatus 10 is moved away from the tank 13 by the robot.

The actuator 20 is energized so as to switch the position of the gripper 16 with the tank heater 18 thereby positioning the apparatus 10 for starting the welding process for another component 11.

FIGS. 10 and 11 are alternate views to FIGS. 6 and 7 illustrating a case where a component 11 is to be mounted on a defective tank 13' wherein the tank's aperture 15' is not positioned correctly.

As described hereinabove, during this movement of the robot towards the tank 13', the linear encoder of the gripper arm cylinder 48 is monitored to detect collisions between the component 11 and the tank 13'.

The component 11 hitting the tank 13' causes the gripper arm cylinder 48 to move back sooner than expected, thereby triggering an alarm.

Even though the apparatus 10 has been described as having heat producing element 18 for heating the tank 13, the configuration of the apparatus 10 would allow to replace such heater 18 by a heat conductive element having the properties to remain sufficiently hot long enough to cause the melting of the tank 13 after rotation of the actuator 20 and during the heating period. According to this particular embodiment, the heat conductive element is heated by the component heater 14 simultaneously to the mounting of the component 11 to the tank's aperture 15.

According to a further illustrative embodiment of the present invention, the apparatus includes only one heater for heating one of the component and the tank. For example, the heater is use to superficially meld the component, which is then hot enough to weld with the tank.

Also, even though the present invention has been described with reference to an apparatus for welding a gas inlet to a gas tank, it is believed to be within the reach of a person skilled in the art to use the present teaching to conceive other apparatuses for welding components having a different geometry than the component 11 for mounting to a different body's aperture than a tank's hole.

Although the present invention has been described hereinabove by way of preferred embodiments thereof, it can be modified, without departing from the spirit and nature of the subject invention as defined in the appended claims.

What is claimed is:

1. An apparatus for welding a plastic component to an aperture of a plastic body, the apparatus comprising:
   a frame element;
   a first heating head mounted to said frame element for heating the component;
   a gripper for gripping the component and for mounting the component to the body's aperture; said gripper further including a collision monitor to detect inadvertent collision between the component and at least one of said first heating head and the body;
   a heater arm having a second heating head mounted thereto for heating the body's aperture; and
   an actuator for mounting both said heater arm and said gripper to said frame element for alternating between a heating position wherein i) ia) said gripper is generally aligned with said first heating head for abutting the component therewith following relative movement towards each other, while ib) said second heating head is positioned for heating the body's aperture, and a work position wherein ii) said gripper is generally aligned with said body's aperture for mounting the component to the body's aperture for welding therewith; said gripper being mounted to said actuator via an arm cylinder; said arm cylinder being configured for applying a predetermined force between said first heating head and said component during heating thereof by said heating head and between said component and said body's aperture during welding thereof; said collision monitor being in the form of a linear encoder mounted to said arm cylinder; the arm cylinder absorbing the inadvertent collision.

2. An apparatus as recited in claim 1, wherein applying a predetermined force between said first heating head and said component during heating thereof includes applying a matching force for a first predetermined period and then applying a heating force for a second predetermined period.

3. An apparatus as recited in claim 1, wherein applying a predetermined force between said component and said body's aperture during welding thereof includes applying a matching force for a first predetermined period and then applying a heating force for a second predetermined period.

4. An apparatus, as recited in claim 1, wherein said actuator includes an output shaft and a slanted block secured to said output shaft for rotation in unison therewith; said slanted block having two perpendicular surfaces, each defining a 45 degree angle with said output shaft and receiving a respective one of said gripper and said heater arm;
   whereby a 180 degree rotation of said output shaft causes the actuator to alternate between said heating position and said work position.

5. An apparatus as recited in claim 1, wherein said linear encoder further allows measuring at least one of a melt depth and a weld depth of the component.

6. An apparatus as recited in claim 1, wherein said heater arm is mounted to said actuator via an arm cylinder.

7. An apparatus as recited in claim 6, wherein said arm cylinder includes a linear encoder for at least one of monitoring a tank melt and applying a predetermined force during said heating the body's aperture.

8. An apparatus as recited in claim 1, wherein said body is a tank and said plastic component is a tank inlet.

9. An apparatus as recited in claim 8, wherein said tank inlet is defined by an elongated cylindrical body having two longitudinal ends and a peripheral collar therebetween.

10. An apparatus as recited in claim 9, wherein said heating head is ring-shaped for receiving said cylindrical body and for abutment of said peripheral collar therewith.

11. An apparatus as recited in claim 1, wherein said frame element includes a rigid post.

12. An apparatus as recited in claim 11, wherein said first heating head is slidably mounted to said post for reciprocal movement therealong.

13. An apparatus as recited in claim 12, wherein said first heating head is suspended near a distal end of an arm; said arm being slidably secured to said post near a proximate end thereof.

14. An apparatus as recited in claim 13, further comprising a cylinder operatively coupling said arm to said post for selectively translating said arm along said post.

15. An apparatus as recited in claim 1 mounted to a robot through said frame member; said robot being for providing displacement of said apparatus.

16. An apparatus for welding a plastic component to an aperture of a body, the apparatus comprising:
   a frame element;
   a heater mounted to said frame element for heating at least one of the body's aperture and the component; and
   a gripper mounted to said frame element via an arm cylinder for gripping the component and for mounting the component to the body's aperture; said gripper including a collision monitor to detect an inadvertent collision of the component with the body while the component is mounted to said body's aperture; the arm cylinder absorbing the inadvertent collision; said collision monitor being in the form of a linear encoder mounted to said arm cylinder.

17. An apparatus as recited in claim 16, wherein said linear encoder further allows measuring at least one of a melt depth of the component and a weld depth of the component.

18. An apparatus as recited in claim 16, wherein said body is a tank and said plastic component is a tank inlet.

19. An apparatus as recited in claim 18, wherein said tank inlet is defined by an elongated cylindrical body having two longitudinal ends and a peripheral collar therebetween.

20. An apparatus as recited in claim 19, wherein said heater includes a ring-shaped element for receiving said cylindrical body and for abutment of said peripheral collar therewith.

21. An apparatus as recited in claim 16 mounted to a robot through said frame member; said robot providing displacement of said apparatus.

* * * * *